(12) United States Patent
Sparks et al.

(10) Patent No.: US 6,338,010 B1
(45) Date of Patent: Jan. 8, 2002

(54) MULTI-SENSOR MODULE FOR COMMUNICATING SENSOR INFORMATION OVER A VEHICLE DATA BUS

(75) Inventors: Douglas Ray Sparks; Tracy Adam Noll, both of Kokomo, IN (US)

(73) Assignee: Delco Electronics Corporation, Kokomo, IN (US)

( * ) Notice: Subject to any disclaimer, the term of this patent is extended or adjusted under 35 U.S.C. 154(b) by 0 days.

(21) Appl. No.: 09/146,896

(22) Filed: Sep. 3, 1998

(51) Int. Cl.[7] ............................................... G08B 21/00
(52) U.S. Cl. ........................ 701/1; 701/33; 340/825.16; 340/459
(58) Field of Search ................................ 701/1, 29, 33, 701/34, 36; 340/459, 825.06, 825.16, 870.01, 870.13, 425.5, 501, 521, 524, 870.16; 370/442, 458

(56) References Cited

U.S. PATENT DOCUMENTS

| | | | | |
|---|---|---|---|---|
| 3,866,166 A | * | 2/1975 | Kerscher, III et al. | ......... 701/29 |
| 4,517,456 A | | 5/1985 | Halsall et al. | .............. 250/226 |
| 4,736,367 A | | 4/1988 | Wroblewski et al. | ......... 370/85 |
| 4,905,507 A | | 3/1990 | Klein et al. | ................. 73/118.1 |
| 5,136,998 A | | 8/1992 | Deutsch | ....................... 123/421 |
| 5,392,024 A | | 2/1995 | Kiuchi et al. | ............... 340/436 |
| 5,469,150 A | | 11/1995 | Sitte | ...................... 340/825.07 |
| 5,508,689 A | | 4/1996 | Rado et al. | ............... 340/25.06 |
| 5,512,890 A | | 4/1996 | Everson, Jr. et al. | ... 340/870.13 |
| 5,626,052 A | | 5/1997 | Lawson | ........................ 73/304 |
| 5,731,510 A | | 3/1998 | Jones et al. | ................. 73/23.31 |
| 5,781,047 A | | 7/1998 | Shreve et al. | ................ 327/110 |

FOREIGN PATENT DOCUMENTS

DE 44 27 254 A1 2/1996

* cited by examiner

*Primary Examiner*—William A. Cuchlinski, Jr.
*Assistant Examiner*—Yonel Beaulieu
(74) *Attorney, Agent, or Firm*—Jimmy L. Funke

(57) ABSTRACT

A multi-sensor module (10) includes a housing (12) with a plurality of vehicle operating condition sensors ($S_1$–$S_N$) mounted therein and a signal processing circuit (20, 26, 30) also mounted therein which receives sensor signals provided by the plurality of sensors ($S_1$–$S_N$). The signal processing circuit (20, 26, 30) is operable to produce at an output thereof (38) a time-division multiplexed signal representative of the various sensor signals according to a vehicle data bus communications protocol. The signal processing circuit output is connected to an electrical connector (36) adapted for connection to an existing vehicle data bus (18) which is further connected to a vehicle control computer (16). The signal processing circuit (20, 26, 30) is accordingly operable to broadcast on the vehicle data bus (18) sensor information provided by each of the sensors ($S_1$–$S_N$) mounted within the module (10).

18 Claims, 4 Drawing Sheets

MULTI-SENSOR MODULE FOR COMMUNICATING SENSOR INFORMATION OVER A VEHICLE DATA BUS

FIELD OF THE INVENTION

The present invention relates generally to systems for communicating sensor information to a vehicle control computer, and more specifically to such systems for communicating sensor information over a vehicle data bus.

BACKGROUND OF THE INVENTION

Automotive control systems typically include a number of engine and/or vehicle operating condition sensors and sensing systems which provide corresponding sensor signals to a control computer. The control computer, which may be an engine/vehicle control computer or other control computer associated with an automotive control module, is in turn responsive to the sensor signals to control an associated automotive component.

In some automotive systems, the number of required sensors may be small and/or a sufficient number of control computer inputs may be readily available so that the sensors may be wired directly to corresponding inputs of the control computer. An example of one such system is illustrated in U.S. Pat. No. 5,392,024 to Kiuchi et al. In recent years, however, the number of automotive sensors or sensing systems have increased and/or the number of available control computer inputs have decreased, and a need to accommodate such a disparity has thus arisen.

Designers of automotive control systems have responded to the proliferation in automotive sensors and sensing systems by designing signal multiplexing systems operable to combine sensor signals, thereby reducing the total number of signal paths required for connection to the associated control computer. Some such multiplexing systems have realized a significant reduction in the number of required signal paths by including communication circuitry for broadcasting the multiplexed signals over a vehicle data bus, or so-called datalink, that is connected to the control computer. An example of a known multiplexing system of the type just described is disclosed in U.S. Pat. No. 5,512,890 to Everson, Jr. et al.

While sensor signal multiplexing systems of the type described by the Everson, Jr. et al. reference address many of the concerns relating to sensor proliferation as discussed hereinabove, these systems have certain drawbacks associated therewith. For example, such systems require the sensors to be individually connected to the multiplexing system, thereby requiring an unnecessarily complex wiring harness that invites potential electromagnetic interference as well as reliability problems. U.S. Pat. No. 5,808,689 to Rado et al. discloses a multiplexing system that locates the multiplexing units proximate to the sensor units, but still requires an unnecessarily complicated albeit shorter wiring harness.

What is therefore needed is a sensor multiplexing system that allows for the broadcasting of multiple sensor signals over a vehicle data bus while also minimizing wiring harness connections between the various electrical components.

SUMMARY OF THE INVENTION

The foregoing shortcomings of the prior art are addressed by the present invention. In accordance with one aspect of the present invention, multi-sensor module for communicating sensor information over a vehicle data bus comprises a plurality of sensors producing a plurality of sensor signals indicative of a corresponding plurality of vehicle operating conditions, a first signal processing circuit receiving the plurality of sensor signals and producing a time-division muliplexed signal representative of the plurality of sensor signals according to a first vehicle data bus communications protocol, and a housing having the plurality of sensors and the first signal processing circuit mounted therein.

In accordance with another aspect of the present invention, a multi-sensor module is connected to a vehicle control computer via a vehicle data bus, wherein the multi-sensor module comprises a plurality of sensors producing a plurality of sensor signals indicative of a corresponding plurality of vehicle operating conditions, a signal processing circuit receiving the plurality of sensor signals and producing at an output thereof a time-division muliplexed signal representative of the plurality of sensor signals according to a vehicle data bus communications protocol, a housing having the plurality of sensors and the signal processing circuit mounted therein, and a connector mounted to the housing, wherein the connector defines one end connected to the output of the signal processing circuit and an opposite end connected to the vehicle data bus.

One object of the present invention is to provide a sensor module configured for mounting multiple sensors therein and equipped with communications circuitry capable of broadcasting on a vehicle data bus information corresponding to sensor signals produced by each of the sensors mounted within the module.

Another object of the present invention is to provide such a module capable of broadcasting sensor information on the vehicle data bus in accordance with any known vehicle data bus communications protocol.

Yet another object of the present invention is to provide such a module that is sufficiently flexible in design to permit a wide variety of sensors to be mounted within the module, and to further permit broadcasting of the sensor information according to a number of different vehicle data bus communication protocols.

These and her objects of the present invention will become more apparent from the following description of the preferred embodiment.

DESCRIPTION OF THE PREFERRED EMBODIMENTS

Figure 1:
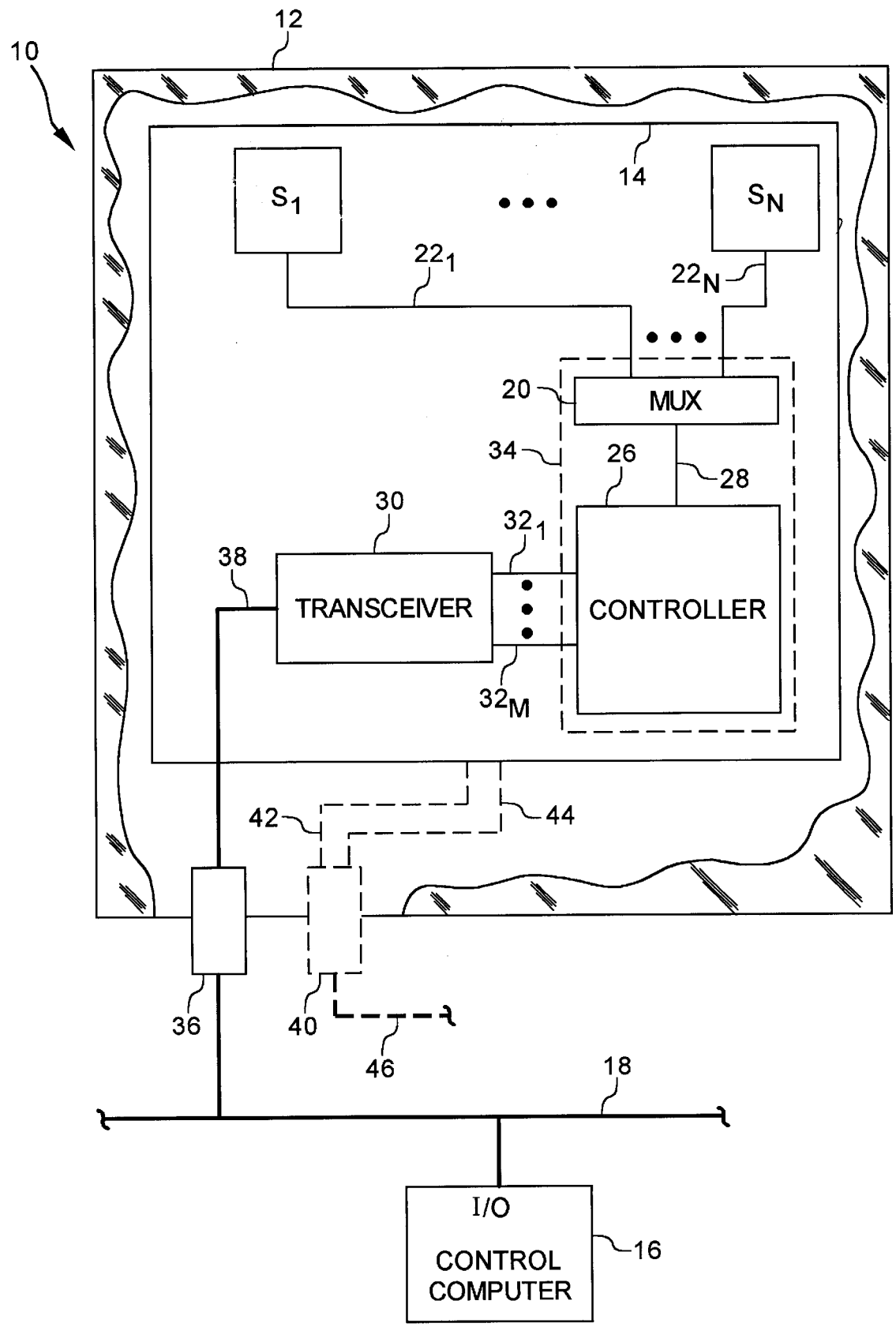
FIG. 1 is a top plan and partial cutaway view of a multi-sensor module connected to a vehicle control computer via a vehicle data bus, in accordance with the present invention.

For the purposes of promoting an understanding of the principles of the invention, reference will now be made to the embodiments illustrated in the drawings and specific language will be used to describe the same. It will nevertheless be understood that no limitation of the scope of the invention is thereby intended, such alterations and further modifications in the illustrated devices, and such further applications of the principles of the invention as illustrated therein being contemplated as would normally occur to one skilled in the art to which the invention relates.

Referring to FIG. 1, a top plan view and partial cutaway view of a multi-sensor module 10 connected to an existing vehicle control computer 16 via an existing vehicle data bus 18, in accordance with one preferred embodiment of the present invention, is shown. Module 10 includes a housing 12 having a number of sensors $S_1$–$S_N$ and signal processing circuitry mounted therein. Housing 12 may or may not be a completely closed container as will be more fully described hereinafter, and may be positioned at various locations within or on the vehicle wherein the particular location of housing 12 will typically be dictated by the type of sensors $S_1$–$S_N$ mounted therein. Accordingly, housing 12 may be formed of various materials including known metals, ceramics, plastics and other polymers, nylon, glass and the like, as well as any combination thereof. The particular material or materials used to form housing 12 will typically be dictated by the environment in which the housing 12 will be located and/or the type of sensors mounted therein. For example, collision sensors typically require rigid attachment thereof to an underlying structure, and a correspondingly rigid material, such as any of a variety of known metals, alloys, composites and/or amalgamations thereof, may be used to form housing 12. As another example, underhood applications typically require resilience to temperature extremes, moisture, corrosive elements and the like, and may therefore accordingly require housing 12 to be formed of a correspondingly resilient material such as ceramic, nylon, some known plastics, and/or the like.

At least one circuit board 14 is mounted within housing 12, preferably in accordance with one or more known techniques, wherein circuit board 14 may be formed of a known and typical circuit board material or materials. For example, circuit board 14 may be a so-called surface mount circuit board which is often formed of a ceramic material such as, for example, alumina, and wherein circuit interconnections are defined thereon. As another example, board 14 may be a so-called printed circuit board formed of, for example, rigid glass and/or fiberglass layers with thin metal interconnection strips printed thereon. As yet another example, board 14 may be a so-called flex-circuit formed of, for example, a flexible film of plastic, polyimide, or the like. In any case, it is to be understood that circuit board 14 may be any known circuit board type or structure, wherein the particular type or structure will typically dictate a number of possible known techniques for mounting the board 14 within the housing 12 (i.e. adhesive, solder, mechanical attachment, etc.). It should also be understood that although only one circuit board 14 is illustrated in FIG. 1, the present invention contemplates that more than one circuit board may be mounted within housing 12, and that such multiple circuit boards may be further mounted to each other in accordance with known techniques.

A number of sensors or sensing systems $S_1$–$S_N$ are mounted within housing 12, wherein sensors $S_1$–$S_N$ may be any known sensors or sensing systems operable to sense operating conditions associated with an internal combustion engine or with a vehicle carrying the engine, and produce sensor signals corresponding thereto. Generally, sensors $S_1$–$S_N$ may be of the same type (e.g. motion sensors) or may be a combination of different sensor types, and those skilled in the art will recognize that any particular combination of known sensors or sensing systems fall within the scope of the present invention. In one preferred embodiment, sensors $S_1$–$S_N$ are mounted to circuit board 14 in accordance with known sensor mounting techniques, as illustrated in FIG. 1, although the present invention contemplates that one or more of the sensors $S_1$–$S_N$ may alternatively be mounted directly to some other structure within housing 12 and/or to housing 12 itself. In any case, sensor $S_1$ is electrically connected to a known multiplexing circuit 20 via signal path $22_1$, and sensor $S_N$ is connected to circuit 20 via signal path $22_N$. Preferably, circuit paths $22_1$ and $22_N$ form part of circuit board 14 as is known in the art, although the present invention contemplates that circuit paths $22_1$ and $22_N$ may be formed of a combination of circuit board interconnections and discrete conductors such as in the case that one or more of the sensors $S_1$–$S_N$ are mounted to a structure within housing 12 that is separate or remote from circuit board 14.

Multiplexing circuit 20 is connected to a known controller circuit 26 via signal path 28, and controller circuit 26 is connected to a known transceiver circuit 30 via number of signal paths $32_1$–$32_M$. In one embodiment, multiplexing circuit 20, controller 26 and transceiver circuit 30 are each formed of an independent integrated circuit that is mounted to circuit board 14 in accordance with known techniques. Alternatively, any combination (or all) of circuits 20, 26 and 30 may be formed of a single integrated circuit. For example, as illustrated in FIG. 1, the multiplexing circuit 20 and controller circuit 26 may be combined to form a single integrated multiplexer/controller circuit 34. In one embodiment, the controller circuit 26 is designed to operate strictly as a preprogrammed controller circuit, as will be described more fully hereinafter. Alternatively, controller circuit 26 includes a microprocessor portion and a memory unit, whereby the microprocessor portion may be used to accomplish a number of functions including sensor calibrations.

In any case, transceiver circuit 30 is electrically connected to one end of an electrical connector 36 via signal path 38, wherein the opposite end of connector 36 is electrically connected to a vehicle data bus 18. Connector 36 is preferably mounted or attached to housing 12. The vehicle data bus 18 is also connected to an input/output port I/O of a control computer 16, wherein control computer 16 may be an engine control computer, vehicle control computer and/or any other auxiliary computer operable to control and manage a vehicle operating condition. Vehicle data bus 18, as this term is used herein, may be any generic vehicle data bus or may alternatively be a predetermined vehicle data bus or "datalink" structure having a predefined bus architecture. Vehicle data bus 18 may accordingly be a one, two, three or more wire conductor having either a generic architecture or a predefined bus architecture such as that defined by, for example, ISO 11519, ISO 11898, SAE J1850, SAE J1708, SAE J1939, or IEEE 1394.

In one embodiment, any electrical power required by sensors $S_1$–$S_N$ and by signal processing circuits 20, 26 and 30 is provided through connector 36 via the vehicle data bus 18 according to known techniques. Alternatively, module 10 may include a second electrical connector 40, preferably mounted or attached to housing 12, and having signal paths 42 and 44 connected therefrom to circuit board 14. The opposite end of connector 40 is electrically connected to a vehicle power and ground bus 46 that typically includes at least a pair of wires carrying a dc potential and a ground potential respectively. The dc, typically 5–12 volts, and ground potentials are thus supplied to circuit board 14 via signal paths 42 and 44.

In operation, multiplexing circuit 20, controller circuit 26 and transceiver circuit 30 form signal processing circuitry which, in accordance with the present invention, is operable to time-division multiplex the sensor signals provided by sensors $S_1$–$S_N$ and broadcast the time-division multiplexed sensor signal on the vehicle data bus 18 according to a predetermined vehicle data bus communications protocol. More specifically, sensors $S_1$–$S_N$ are operable to produce sensor signals indicative of corresponding vehicle operating conditions, wherein each of the various sensor signals are provided to multiplexing circuit 20 via signal paths $22_1$–$22_N$. Multiplexing circuit 20 is operable, as is known in the art, to time-division multiplex the sensor signals on signal paths $22_1$–$22_N$ and provide a corresponding time-division multiplexed sensor signal on signal path 28. Controller circuitry 26 is preferably preprogrammed in accordance with a predetermined vehicle data bus communications protocol to process the time-division multiplexed sensor signal and produce the time-division multiplexed sensor signal according to the predetermined vehicle data bus communications protocol on signal paths $32_1$–$32_M$, wherein M may be any integer. The transceiver circuitry 30 is, in turn, operable to broadcast the time-division multiplexed sensor signal, according to the predetermined vehicle data bus protocol, on signal path 38 and, via connector 36, on vehicle data bus 18. Control computer 16 may thus access the sensor signals produced by sensors $S_1$–$S_N$ by monitoring the I/O port and receiving the time-division multiplexed sensor signal broadcast on the vehicle data bus 18 by module 10 according to the predefined vehicle data bus communications protocol.

The controller circuitry 26 may be programmed to process the time-division multiplexed sensor signal and produce this signal according to any of a variety of desired vehicle data bus communications protocols. Alternatively, as described hereinabove, controller circuitry 26 may include a microprocessor portion and a memory unit that has information stored therein relating to conversion of sensor data to the desired vehicle data bus communications protocol. In this alternative embodiment, the microprocessor portion of the controller circuitry 26 is operable to process the time-division multiplexed sensor signal according to instructions stored in the memory unit and produce the time-division multiplexed sensor signal according to the desired vehicle data bus communications protocol. In either case, controller circuitry 26 may be programmed to convert the time-division multiplexed sensor signal to any of a variety of known vehicle data bus communication protocols including, but not limited to, CLASS 2, CAN, GMLAN, UART, PALMNET, ABUS, MI-BUS, I2C, Safety Bus, CCD, BEAN or the like.

Figure 2:
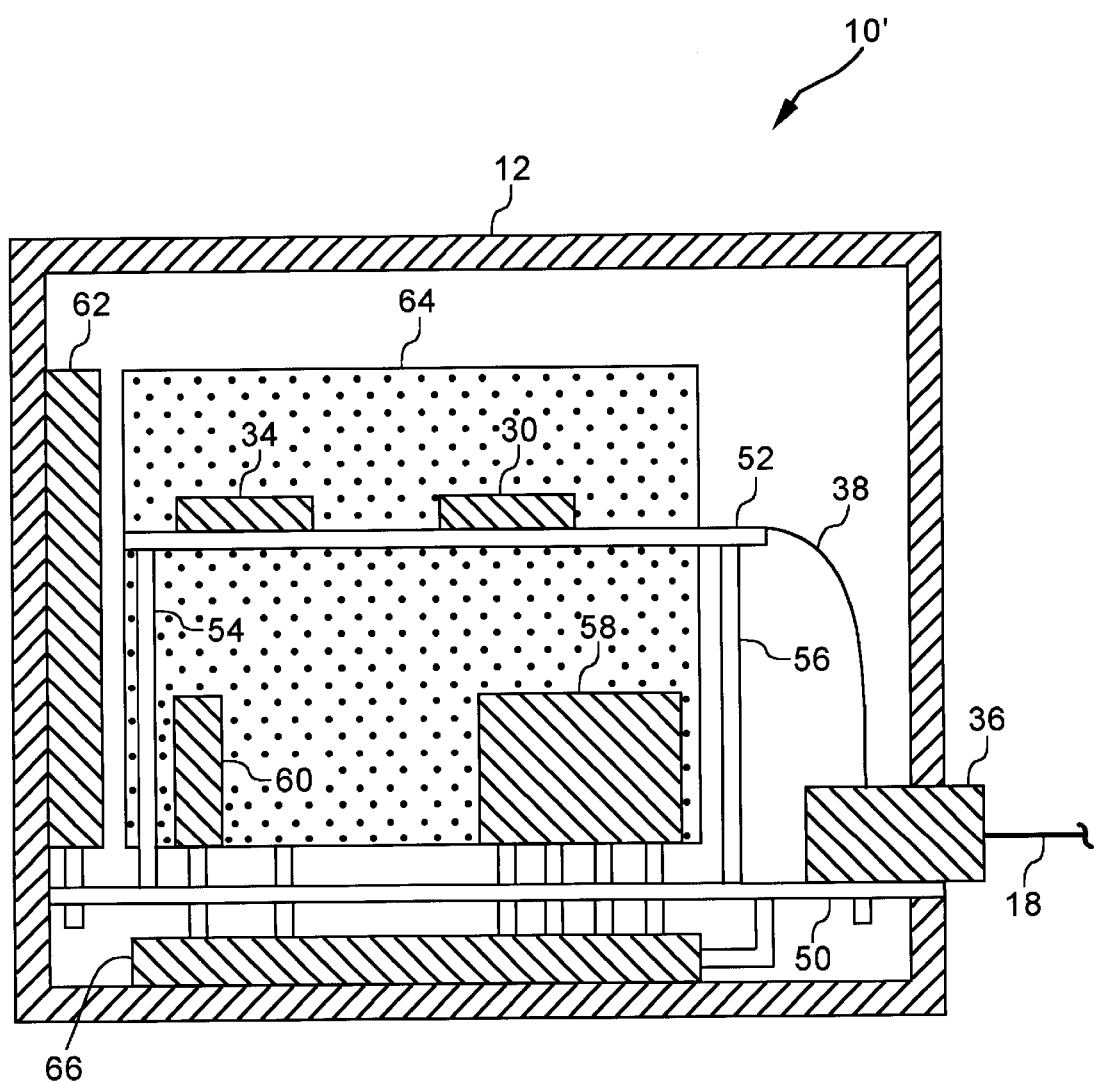
FIG. 2 is a side-elevational and cross-sectional view of another multi-sensor module having a number of vehicle motion and impact sensors mounted therein, in accordance with the present invention.

Referring now to FIG. 2, a side-elevational and cross-sectional view of another preferred embodiment of a multi-sensor module 10', in accordance with the present invention, is shown. It is to be understood that module 10' is an example of one specific application of the generic module 10 shown and described with respect to FIG. 1, wherein module 10' includes a number of vehicle motion and impact sensors. In this specific embodiment, housing 12 may be a complete enclosed container that is preferably rigid and mountable at or near a center of gravity of the vehicle. It should also be noted that circuit board 14 of FIG. 1 is, in the embodiment illustrated in FIG. 2, replaced with a pair of circuit boards 50 and 52. Circuit board 50 is preferably mounted within housing 12 and further has connector 36 as well as all impact and motion sensors mounted thereto. Specifically, circuit board 50 includes attached thereto a first known high-G acceleration sensing circuit 58, a second known high-G acceleration sensing circuit 60 disposed 90 degrees relative to sensing circuit 58, a first known angular rate and low-G acceleration sensing circuit 62, a second known angular rate and low-G acceleration sensing circuit 64 disposed 90 degrees relative to sensing circuit 62 and a third known angular rate and low-G acceleration sensing circuit 66 disposed 90 degrees relative to both sensing circuits 62 and 64. Circuit board 52 has the signal processing circuitry, represented as circuits 30 and 34, mounted thereto, wherein signal path 38 extends from circuit board 52 to connector 36 and is electrically connected to vehicle data bus 18. Circuit board 52 is preferably connected to structurally and electrically to circuit board 50 via connection paths 54 and 56 such that signal paths from each of the sensors 58–66 extend therealong to multiplexer/controller circuit 34. Module 10' thus provides a self-contained vehicle motion and impact sensing system that provides for two axes of impact detection (sensors 58 and 60) and three axes of motion, i.e. pitch (sensor 62), roll (sensor 64) and yaw (sensor 66), wherein a time-devision multiplexed combination of signals produced by these sensors is broadcast by signal processing circuitry 30 and 34 onto a vehicle data bus according to a desired vehicle data bus communications protocol.

Figure 3:
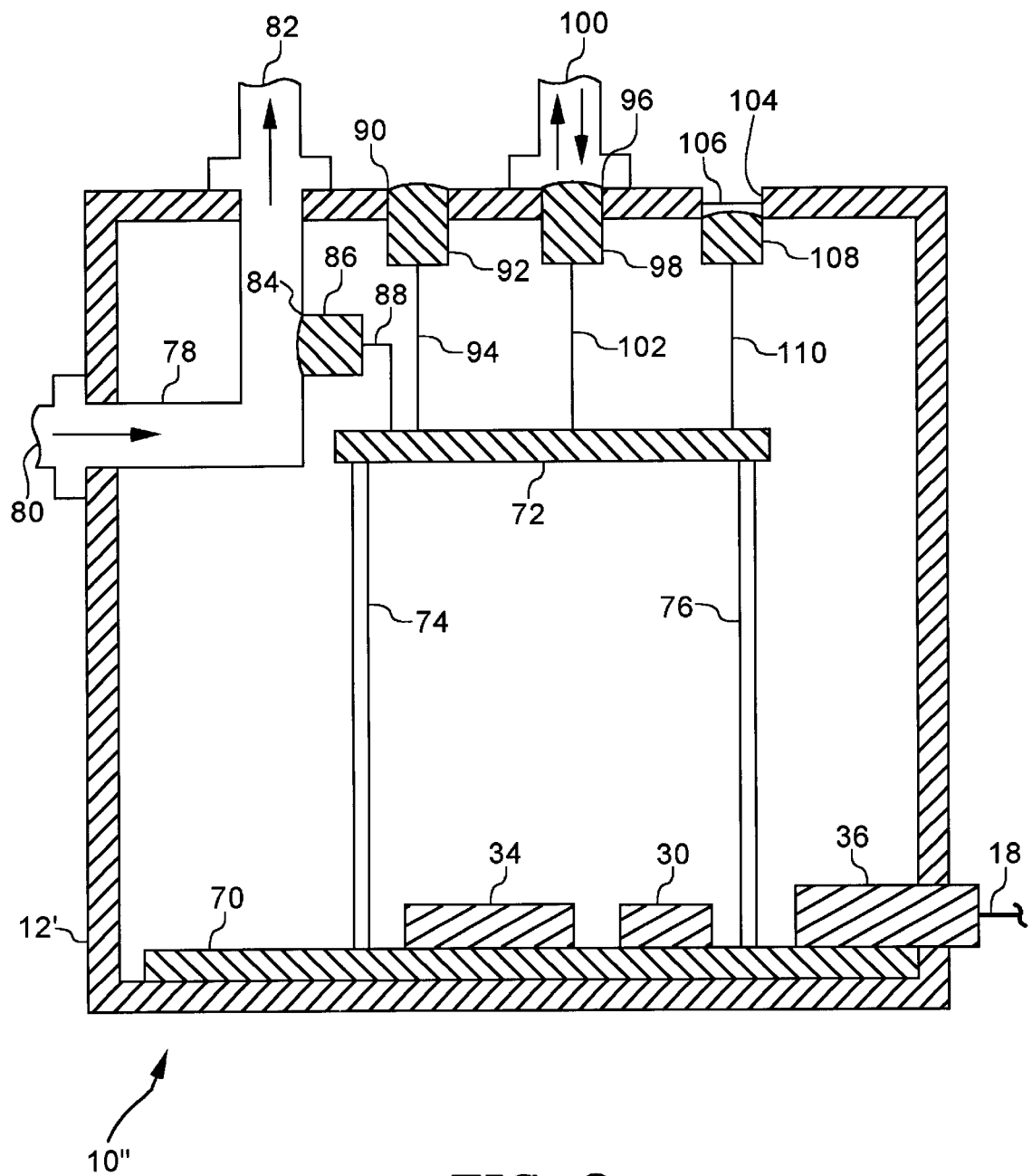
FIG. 3 is a side-elevational and cross-sectional view of yet another multi-sensor module having a number of different sensors mounted therein, in accordance with the present invention.

Referring now to FIG. 3, a side-elevational and cross-sectional view of yet another alternative embodiment of a multi-sensor module 10", in accordance with the present invention, is shown. Module 10" is included to illustrate how the multi-sensor module concept of the present invention is sufficiently flexible to allow a number of different types of sensors to be combined within a single housing, and wherein signals relating to each of the sensors are broadcast by circuitry contained within the module 10" onto a vehicle data bus 18 according to a desired vehicle data bus communications protocol. In this embodiment, housing 12' includes a number of windows and/or ports and is therefore not a completely enclosed container. However, each of the various windows and/or ports are preferably sealed by mounting an appropriate sensor thereto so that the interior of housing 12' is isolated from the outside during use.

Like module 10' of FIG. 2, module 10" includes a pair of circuit boards 70 and 72, wherein circuit board 70 is mounted within housing 12' and has multiplexer/controller circuit 34, transceiver circuit 30 and connector 36 mounted thereto. Circuit board 72 has a number of sensors electrically connected thereto wherein the sensors, in this embodiment, are mechanically attached to housing 12' rather than to the circuit board 72 as shown in the previously discussed embodiments. In any case, circuit board 72 is mounted to circuit board 70 via connection paths 74 and 76 such that signal paths extend therealong from each of the sensors to multiplexer/controller circuit 34.

One of the sensors included in module 10" is a gas sensor 86 operable to sample a gas such as, for example, CO, NOx, humidity, ozone, or the like, and provide a corresponding gas level signal to circuit 34 via signal path 88. In so doing, module 10" preferably includes a passageway 78 extending therethrough having an inlet port 80 receiving the gas and an outlet port 82 from which gas flow continues. Passageway 78 preferably defines an opening 84 therein through which sensor 86 extends so as to position a gas sensing portion of sensor 78 in contact with the gas flowing through passageway 78. Preferably, passageway 78 sealingly engages housing 12' adjacent to the gas inlet port 80 and the gas outlet port 82 so that the interior of housing 12' is isolated from the ambient area surrounding housing 12'. Likewise, sensor 84 preferably sealingly engages opening 84 to thereby isolate the interior of housing 12' from the gas flowing through passageway 78.

Another one of the sensors included in the module 10" is a temperature sensor 92 operable to sense temperature of the ambient area surrounding module 10" and provide a corresponding temperature signal to circuit 34 via signal path 94. Housing 12' preferably defines an opening 90 therein through which temperature sensor 92 extends so as to position a temperature sensing portion of sensor 92 in contact with the ambient area surrounding module 10". Preferably, sensor 92 sealingly engages opening 90 of housing 12' to thereby isolate the interior of housing 12' from the ambient area surrounding housing 12'.

Yet another one of the sensors included in the module 10" is a pressure sensor 98 operable to sense the pressure of a fluid or vacuum within passageway 100 that is affixed to housing 12', and provide a corresponding pressure signal to circuit 34 via signal path 102. Housing 12' preferably defines an opening 96 through which a pressure sensor 98 extends so as to position a pressure sensing portion of sensor 98 into contact with the fluid for which pressure or vacuum is to be determined. Preferably, passageway 100 sealingly engages housing 12' adjacent to opening so that the actual pressure within passageway 100 is not corrupted by the ambient area surrounding housing 12'. Likewise, sensor 98 preferably sealingly engages opening 96 to thereby isolate the interior of housing 12' from the fluid flowing through passageway 78.

Still another one of the sensors included in the module 10" is a light sensor 108 operable to sense light intensity of the area surrounding housing 12' and provide a corresponding light signal to circuit 34 via signal path 110. Housing 12' preferably defines an opening 104 through which light sensor 108 extends so as to position a light sensing portion of sensor 108 into within view of the ambient area surrounding module 10". In one embodiment, a light transmissive window 106 is positioned within opening 104 and sealingly engages opening 104 so that the interior of housing 12' is isolated from the ambient area surrounding module 10". Alternatively, window 106 may be omitted in which case sensor 108 preferably sealingly engages opening 104 to thereby isolate the interior of housing 12' from the ambient area surrounding module 10". Those skilled in the art will recognize that sensor 108 may alternatively be used to sense an intensity of other light sources such as, for example, sunlight, IR radiation or other light sources, via proper placement of module 10" proximate to the appropriate radiation source and/or via attachment of a light-directing passageway, similar to passageways 78 or 100, proximate to opening 104.

Figure 4:
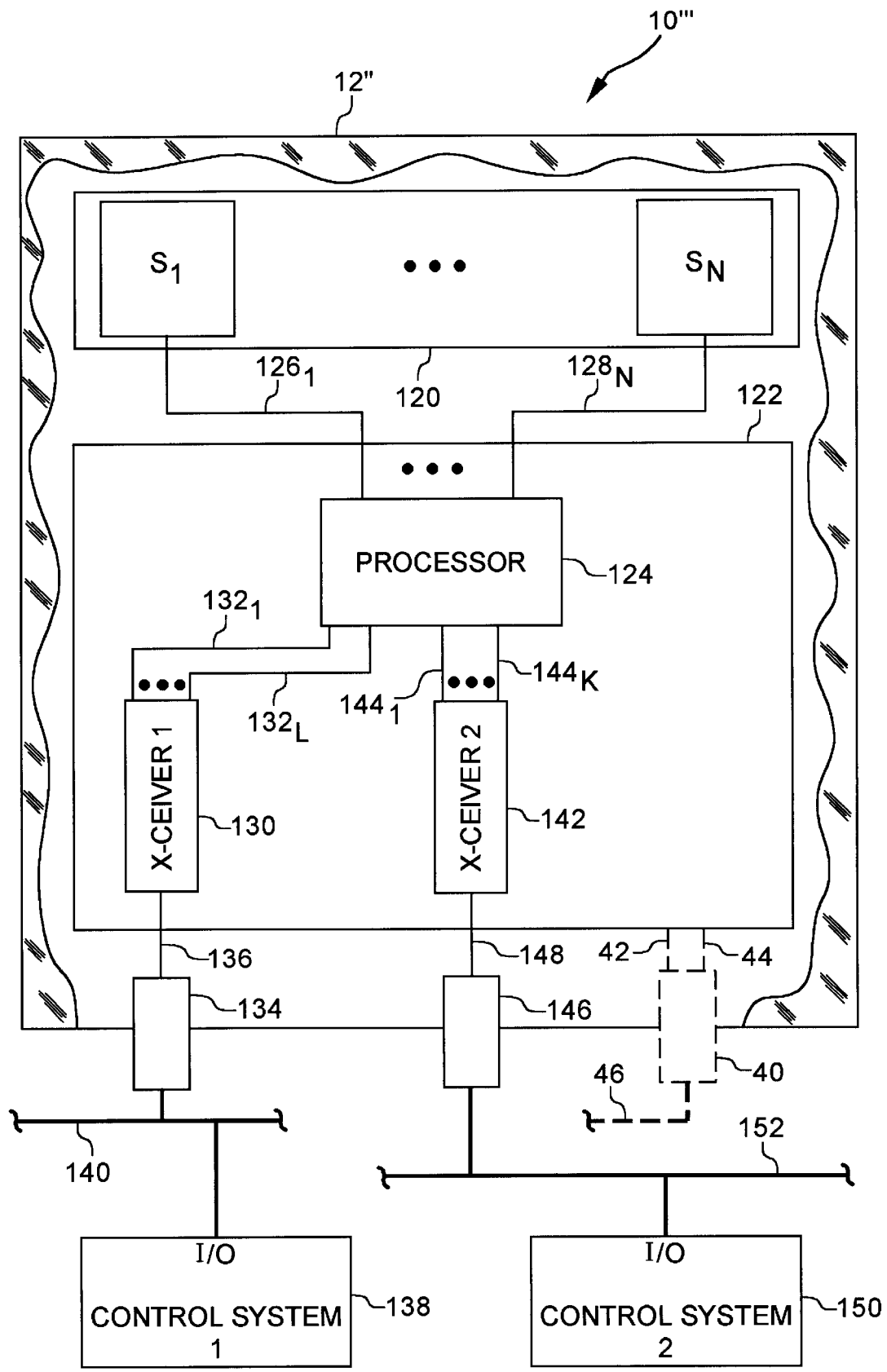
FIG. 4 is a top plan and partial cutaway view of a multi-sensor module connected to a pair of vehicle control computers via different vehicle data buses, in accordance with the present invention.

Referring now to FIG. 4, a top plan and partial cutaway view of another preferred embodiment of a multi-sensor module 10''', in accordance with the present invention, is shown. Module 10''' is similar in many respects to module 10 illustrated in FIG. 1 in that a housing 12" includes a number of sensors $S_1-S_N$ and signal processing circuitry mounted therein, wherein the signal processing circuitry is operable to broadcast onto at least one vehicle data bus a time-division multiplexed signal corresponding to the various sensor signals in accordance with a predefined vehicle data bus communications protocol. In the embodiment illustrated in FIG. 4, sensors $S_1-S_N$ are mounted to a circuit board 120 which is itself preferably mounted within housing 12". Alternatively, one or more of the sensors $S_1-S_N$ may be mechanically mounted to another structure within housing 12" or to housing 12" itself with each of the sensors being electrically connected to circuit board 120. Sensors $S_1-S_N$ are electrically connected to a processor 124 via a corresponding number of signal paths $126_1-126_N$, wherein processor 124 is mounted to a second circuit board 122. Processor 124 may be a combination multiplexer/controller as described hereinabove with respect to FIG. 1 or may further include a microprocessor portion and a memory unit also as described hereinabove. In any case, processor 124 is electrically connected to a first transceiver 130 via a number of signal paths $132_1-132_L$, wherein L may be any integer. Transceiver 130 is preferably mounted to circuit board 122 and is electrically connected via signal path 136 to a first connector 134 that is preferably attached to housing 12". Connector 134 is electrically connected to a first vehicle data bus 140 which is also connected to an input/output port I/O of a first control system 138, wherein control system 138 includes a control computer as described hereinabove with respect to FIG. 1.

Processor 124 is also electrically connected to a second transceiver 142 via number of signal paths $144_1-144_K$, wherein K may be any integer. Transceiver 142 is preferably mounted to circuit board 122 and is electrically connected via signal path 148 to a second connector 146 that is preferably attached to housing 12". Connector 146 is electrically connected to a second vehicle data bus 152 which is also connected to an input/output port I/O of a second control system 150, wherein control system 150 includes a control computer as described hereinabove with respect to FIG. 1.

Module 10''' may further include a power and ground bus connection thereto (40–46) identical to that described with respect to FIG. 1, or may alternatively receive power via one of the vehicle data buses 140 or 152. In either case, module 10''' is similar in operation to module 10 described with respect to FIG. 1 except that module 10''' is capable of broadcasting time-division multiplexed sensor signals on vehicle data buses 140 and 152 according to different vehicle data bus communication protocols. Specifically, processor 124 is preferably configured, according to one or more techniques described hereinabove, to translate the time-division multiplexed sensor signal to two separate vehicle data bus communication protocols. One of the multiplexed sensor signals, according to a first vehicle data bus communications protocol, is broadcast on vehicle data bus 140 by transceiver 140, and the second multiplexed sensor signal, according to a second vehicle data bus communications protocol, is broadcast on vehicle data bus 152 by transceiver 142. In this manner, module 10''' is operable to broadcast the time-division multiplexed sensor signal to a number of vehicle control systems wherein the various vehicle control systems communicate over a dedicated vehicle data bus having a unique communications protocol. For example, the first vehicle control system 138 may be a computer-controlled supplemental inflatable restraint system wherein the vehicle data bus architecture requires communication via a CAN protocol, and the second vehicle control system may be an engine control system wherein the vehicle data bus architecture requires communication via an SAE J1850 protocol. Those skilled in the art will recognize that the concepts described with respect to FIG. 4 may easily be extended to include additional transceivers and connectors for communication with additional vehicle control systems having different bus communication protocols.

While the invention has been illustrated and described in detail in the foregoing drawings and description, the same is to be considered as illustrative and not restrictive in character, it being understood that only the preferred embodiments have been shown and described and that all changes and modifications that come within the spirit of the invention are desired to be protected.

The embodiments of the invention in which an exclusive property or privelege is claimed are defined as follows:

1. A multi-sensor module for communicating sensor information over a vehicle data bus, comprising:

a plurality of sensors producing a plurality of sensor signals indicative of a corresponding plurality of vehicle operating conditions;

a first signal processing circuit receiving said plurality of sensor signals and producing a first time-division multiplexed signal representative of said plurality of sensor signals according to a first vehicle data bus communications protocol; and a housing having said plurality of sensors and said first signal processing circuit mounted therein.

2. The multi-sensor module of claim 1 further including a first connector mounted to said housing, said first connector having an input receiving said first time-division multiplexed signal according to said first vehicle data bus communications protocol and an output configured for connection to a first vehicle data bus.

3. The multi-sensor module of claim 2 further including a circuit board mounted within said housing, said circuit board having said plurality of sensors and said signal processing circuit mounted thereto.

4. The multi-sensor module of claim 2 further including first and second circuit boards mounted within said housing, said first circuit board having said plurality of sensors mounted thereto and said second circuit board having said first signal processing circuit mounted thereto.

5. The multi-sensor module of claim 2 further including:

a second signal processing circuit receiving said plurality of sensor signals and producing a second time-division multiplexed signal representative of said plurality of sensor signals according to a second vehicle data bus communications protocol; and a second connector mounted to said housing, said second connector having an input receiving said second time-division multiplexed signal according to said second vehicle data bus communications protocol and an output configured for connection to a second vehicle data bus.

6. The multi-sensor module of claim 1 wherein said plurality of sensors include any of motion, impact, pressure, temperature, light and gas sensors.

7. The multi-sensor module of claim 2 further including a second connector mounted to said housing, said second connector having an input configured for connection to a vehicle power and ground bus and an output connected to said signal processing circuit to thereby supply power and ground potentials thereto.

8. The multi-sensor module of claim 7 wherein said output of said second connector is further connected to at least one of said plurality of sensors to thereby supply power and ground potentials thereto.

9. The multi-sensor module of claim 1 wherein said first signal processing circuit includes:

a multiplexer circuit receiving said plurality of sensor signals and producing a multiplexed signal indicative of said plurality of sensor signals;

a controller circuit receiving said multiplexed signal and producing said time-division multiplexed signal according to said first vehicle data bus communications protocol; and a transceiver receiving said first time-division multiplexed signal from said controller circuit and broadcasting said first time-division multiplexed signal at an output thereof.

10. The multi-sensor module of claim 9 further including a connector mounted to said housing, said connector having one end connected to said transceiver output and an opposite end configured for connection to a vehicle data bus.

11. The muiti-sensor module of claim 9 wherein said multiplexer circuit and said controller circuit are combined to form a single integrated circuit.

12. The multi-sensor module of claim 1 wherein said first signal processing circuit includes a microprocessor portion operable to electronically calibrate any of said plurality of sensors.

13. The multi-sensor module of claim 12 wherein said first signal processing circuit further includes a memory unit having a number of different vehicle data bus communication protocol conversion instructions therein;

and wherein said first signal processing circuit is operable to produce said first time-division multiplexed signal representative of said plurality of sensor signals according to any of said number of different vehicle data bus communication protocol conversion instructions within said memory unit.

14. In combination:

a first vehicle control computer having an input/output port;

a first vehicle data bus connected to said input/output port of said first vehicle control computer; and a multi-sensor module for communicating sensor information over said first vehicle data bus, said multi-sensor module comprising:

a plurality of sensors producing a plurality of sensor signals indicative of a corresponding plurality of vehicle operating conditions;

a first signal processing circuit receiving said plurality of sensor signals and producing at an output thereof a first time-division multiplexed signal representative of said plurality of sensor signals according to a first vehicle data bus communications protocol;

a housing having said plurality of sensors and said first signal processing circuit mounted therein; and a first connector mounted to said housing, said first connector defining one end connected to said output of said first signal processing circuit and an opposite end connected to said first vehicle data bus.

15. The combination of claim 14 further including:

a second vehicle control computer; and a second vehicle data bus;

and wherein said multi-sensor module further includes a second signal processing circuit receiving said plurality of sensor signals and producing a second time-division multiplexed signal representative of said plurality of sensor signals according to a second vehicle data bus communications protocol; and a second connector mounted to said housing, said second connector defining one end receiving said second time-division multiplexed signal according to said second vehicle data bus communications protocol and an opposite end connected to said second vehicle data bus.

16. The combination of claim 15 further including a vehicle power and ground bus;

and wherein said multi-sensor module further includes a third connector mounted to said housing, said third connector connected at one end to said vehicle power and ground bus and at an opposite end to said signal processing circuit to thereby provide power and ground potentials thereto.

17. The combination of claim 16 wherein said opposite end of said third connector is further connected to at least one of said plurality of sensors to thereby provide power and ground potentials thereto.

18. The multi-sensor module of claim 14 wherein said plurality of sensors include any of motion, impact, pressure, temperature, light and gas sensors.

\* \* \* \* \*